US006984427B2

(12) United States Patent
Galkiewicz et al.

(10) Patent No.: US 6,984,427 B2
(45) Date of Patent: Jan. 10, 2006

(54) MICROSTRUCTED RELEASE LINER

(75) Inventors: Robert K. Galkiewicz, Roseville, MN (US); Brian E. Spiewak, Inver Grove Heights, MN (US); Dennis R. Nichols, Hutchinson, MN (US); Janet R. Kirkman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/044,367

(22) Filed: Jan. 10, 2002

(65) Prior Publication Data

US 2003/0129343 A1 Jul. 10, 2003

(51) Int. Cl.
*B32B 31/00* (2006.01)
*C09J 7/02* (2006.01)

(52) U.S. Cl. .................. 428/40.1; 428/40.2; 428/40.9; 428/41.3; 428/41.5; 428/41.8; 428/42.1; 428/120; 428/167; 428/172

(58) Field of Classification Search .............. 428/40.1, 428/40.2, 40.9, 41.3, 41.5, 41.8, 42.1, 119, 428/120, 167, 172
See application file for complete search history.

(56) References Cited

U.S. PATENT DOCUMENTS

| | | | | |
|---|---|---|---|---|
| 3,331,729 A | | 7/1967 | Danielson et al. | 161/162 |
| 4,397,905 A | | 8/1983 | Dettmer et al. | 428/180 |
| 4,761,320 A | | 8/1988 | Coburn, Jr. | 428/167 |
| 4,781,957 A | | 11/1988 | Brown et al. | 428/43 |
| 4,894,060 A | | 1/1990 | Nestegard | 604/391 |
| 5,141,790 A | * | 8/1992 | Calhoun | 428/40.1 |
| 5,273,805 A | | 12/1993 | Calhoun et al. | 428/156 |
| 5,344,681 A | | 9/1994 | Calhoun et al. | 428/42 |
| 5,344,693 A | * | 9/1994 | Sanders | 428/167 |
| 5,449,540 A | | 9/1995 | Calhoun et al. | 428/42 |
| 5,589,246 A | * | 12/1996 | Calhoun et al. | 428/120 |
| 5,679,302 A | | 10/1997 | Miller et al. | 264/167 |
| 6,197,397 B1 | | 3/2001 | Sher et al. | 428/42.3 |
| 6,203,885 B1 | | 3/2001 | Sher et al. | 428/156 |

FOREIGN PATENT DOCUMENTS

| | | |
|---|---|---|
| JP | 6-33022 | 2/1994 |
| JP | 6-116538 | 4/1994 |
| JP | 2000-334877 | 12/2000 |
| WO | WO 93/05123 | 3/1993 |
| WO | WO 01/15820 A1 | 3/2001 |
| WO | WO 01/70897 A2 | 9/2001 |
| WO | WO 02/074877 A2 | 9/2002 |

* cited by examiner

*Primary Examiner*—Nasser Ahmad
(74) *Attorney, Agent, or Firm*—Lisa P. Fulton

(57) ABSTRACT

The present invention provides an article including a microstructured release liner having a plurality of outwardly extending protrusions associated with an adhesive layer such that the protrusions penetrate the adhesive layer.

35 Claims, 2 Drawing Sheets

MICROSTRUCTED RELEASE LINER

FIELD OF THE INVENTION

The present invention provides a microstructured release liner having a plurality of outwardly extending protrusions. In particular, the present invention provides an article including a microstructured release liner having a plurality of outwardly extending protrusions associated with an adhesive layer such that the protrusions substantially penetrate the adhesive layer.

BACKGROUND OF THE INVENTION

Release materials, such as release webs and sheets have previously been used in a wide variety of articles of manufacture typically for temporarily covering a tacky adhesive such as a pressure sensitive adhesive. Additionally, the release materials of the prior art have been used in a wide variety of manufacturing processes requiring the use of a release material to transfer an adhesive layer from one substrate to another.

However, such prior art release materials usually have a number of disadvantages. It is known to those skilled in the release material art, that release materials are provided with a coating, such as a silicone coating, to improve the release properties. However, when a release material is provided with a silicone coating and stored in roll form, a common practice, the reverse side of the release material can pick up silicone coating by offsetting. The offset silicone coating can be objectionably transferred during use of the release material. Such objectionable silicone offsetting is also known to sheet release material wherein the sheet release material, before being applied to other structures, is stacked vertically before the silicone is completely cured causing transfer or offsetting of silicone from the top surface of a lower sheet to the bottom surface of the next above sheet. The use of release coatings also requires additional process steps in order to apply the coating that adds to production costs. Furthermore, release materials of the prior art that include a release coating suffer from an increase in release force with time due to degradation of the coating integrity with use or over time.

It is also known in the prior art to decrease the release force of a release material through a reduction in contact area between the adhesive and release material. Typically, this is accomplished by creating a patterned texture on the surface of the release material that contacts the adhesive layer. The decrease in release force of these types of release materials is derived from the fact that the adhesive does not contact the entire surface area of the release material but rather only makes point or line contact with the top surface of the patterned texture. Thus, such release materials decrease release force by effectively decreasing contact area between the adhesive and the release material from area contact to point or line contact.

These types of textured release material, however, have disadvantages. The reduction of area contact to point or line contact does not provide a release material suitable for use at elevated temperatures or under compressive loads. Typically, the texture applied to the release liner is of a geometry so as to only make point contact with the adhesive. The textures are not designed to penetrate the adhesive layer as such penetration would effectively increase contact area between the adhesive and the release material beyond that of point or line contact contrary to the theory behind textured release materials. However, as compressive force is applied to textured release liners the adhesive is forced into the release liner so as to cause the adhesive to completely wet out the release liner. Thus, compressive force applied to textured release liners leads to total area contact between the release material and adhesive layer and an increase in release force.

Additionally, at elevated temperatures, adhesives can flow and migrate toward the release liner land eventually completely wetting out the release liner. The textures typically used with the release liners of the prior art are of a geometry that does not inhibit the adhesive from contacting the land of the release materials at elevated temperatures.

There are a number of processing needs requiring the use of a release material to transfer an adhesive layer from one substrate to another. New adhesives are being developed that adhere well to a wide variety of surfaces, including low energy surfaces such as for example, polypropylene and polyethylene. The aggressive adhesion of these adhesives makes them unsuitable for use with conventional release materials. Among these new adhesives are silicone adhesives for example that are not compatible with the release materials of the prior art, and are placing strong demands on release material properties. Accordingly, there exists a need in the art for improved release materials for use at elevated temperatures, under compressive loads and with modem adhesives.

SUMMARY OF THE INVENTION

Generally, the present invention provides an improved release material which may be embodied as a sheet or web and is suitable for use at elevated temperatures, under compressive loads and with aggressive modern adhesives. One embodiment is an article that includes an adhesive layer, and a release liner layer where the release liner layer includes a first surface associated with said adhesive layer and a second surface, where the first surface is embossed to provide a plurality of outwardly extending protrusions that penetrate said adhesive layer.

Another embodiment of the present invention is an article including a first adhesive layer, a release layer, and a second adhesive layer, where the release layer comprises a first surface associated with the first adhesive layer and a second surface associated with the second adhesive layer, where the first surface is embossed to provide a plurality of outwardly extending protrusions that penetrate the first adhesive layer, and where the second surface is embossed to provide a plurality of outwardly extending protrusions that penetrate the second adhesive layer.

In a further embodiment the present invention is directed toward a method for the release of an adhesive from a substrate including the steps of applying the adhesive to a substrate, and removing the adhesive from the substrate where the substrate includes a first surface associated with said adhesive and a second surface, where the first surface is embossed to provide a plurality of outwardly extending protrusions that penetrate the adhesive layer.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
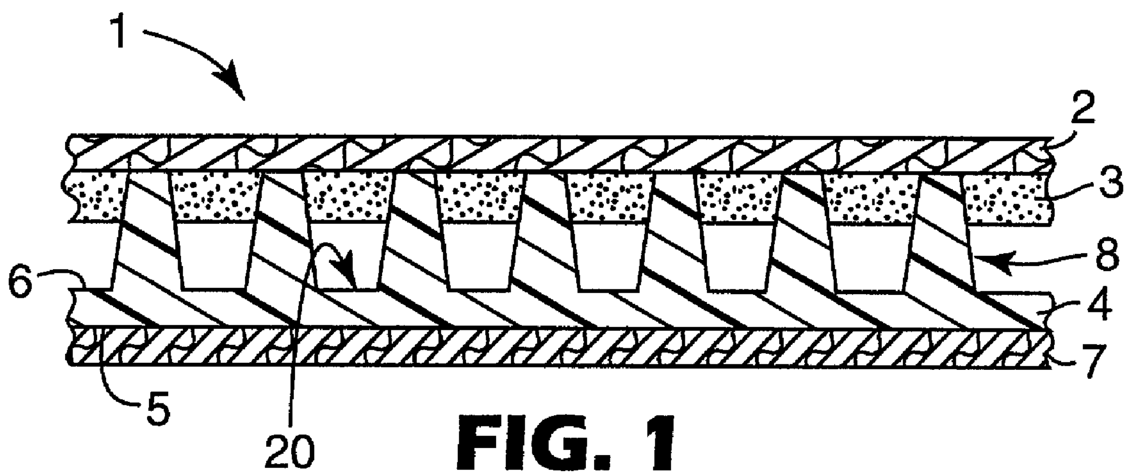
FIG. 1 is a cross-sectional view of an article including the release liner layer of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

All numbers are herein assumed to be modified by the term "about."

The recitation of numerical ranges by endpoints includes all numbers subsumed within that range (e.g., 1 to 5 includes 1, 1.5, 2, 2.75, 3, 3.80, 4, and 5).

As used herein "point contact" means that the adhesive rests primarily on the tip or terminus of a release liner feature, such as a post or other three-dimensional protrusion for example, without substantially conforming to the shape of the feature and therefore without touching the sides of the feature.

As used herein "line contact" means that the adhesive rests primarily on the tip or terminus of a liner ridge or other substantially two-dimensional protrusion or feature without substantially conforming to the cross-sectional shape of the ridge and therefore without touching the sides of the feature.

Referring to FIG. 1, shown is a composite structure indicated by general numerical designation 1 which includes an optional backing layer 2, a layer of adhesive 3, and a release liner layer 4. The release liner layer includes a second surface 5 and a first surface 6. The release liner layer 4 may also include a printable backing substrate 7, such as paper for example. The release liner layer 4 in the embodiment shown in FIG. 1 is shown in a sheet embodiment but it will be understood that such improved release liner layer 4 may also be embodied in web form.

Pressure sensitive adhesive layers are one example of a preferred adhesive layer 3 in accordance with the present invention. Pressure-sensitive adhesives (PSAs) are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Useful PSAs include natural rubbers, synthetic rubbers, block copolymers, (meth)acrylates, silicones, and olefins.

Release material refers to a component, that exhibits low adhesion to an adhesive, such as a pressure sensitive adhesive (PSA), so that separation can occur substantially between the adhesive and release material interface. Release coatings can be used as a "liner" for adhesive articles, such as labels or medical dressing bandages, where the adhesive article is generally supplied as a sheet-like construction, as opposed to a roll-like construction. In tape applications, a release material is often referred to as a "low adhesion backsize", or LAB. In this form, the adhesive surface contacts the back surface of the article. The LAB prevents the adhesive from permanently adhering to the back surface of the article and allows that article to be unwound.

The release liner layer 4 can be produced from virtually any orientable thermoplastic resin that is suitable for extrusion molding. Typically, the release liner layer is selected from a group of materials including polymeric films of various stiffness such as, for example, polyesters such as poly(ethylene terephthalate), polyolefins such as polypropylene and polyethylene, polystyrenes such as poly(styrene-acrylonitrile) and poly(acrylonitrile-butadiene-styrene), plasticized polyvinyl chloride, polycarbonates or polymethacrylates. Useful polymeric materials for the production of the release liner layer described herein include copolymers of the monomers above such as a copolymer of polypropylene and polyethylene containing 17.5% polyethylene and having a melt flow index of 30, that is available as SRD7-463 from Shell Oil Company, Houston, Tex. A particularly useful polymeric material for the production of the release liner layer described herein includes a polypropylene homopolymer that is available as Escorene® from Exxon Coproration, Houston, Tex.

Figure 2:
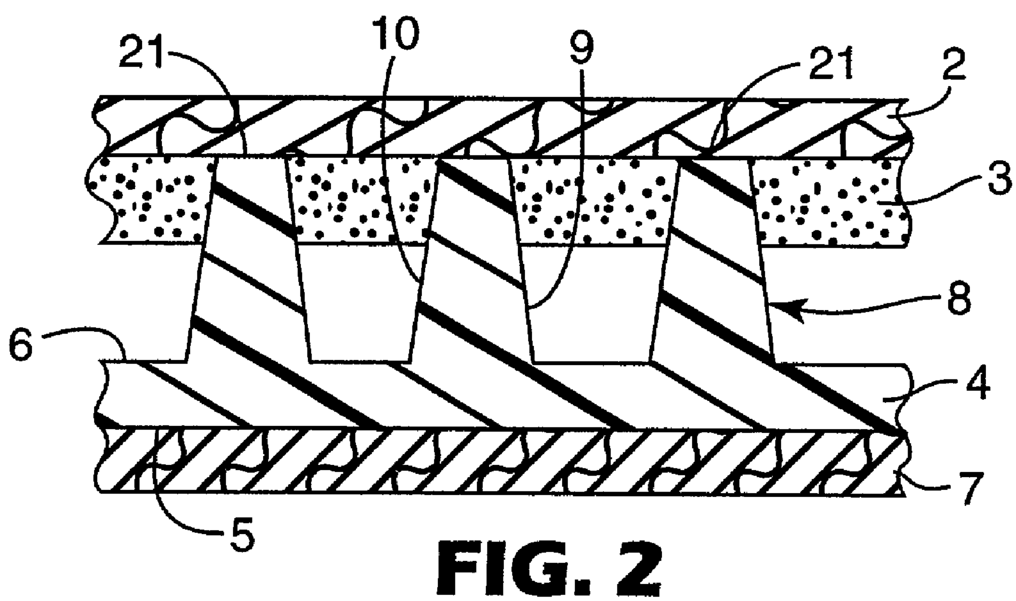
FIG. 2 is an enlarged portion of FIG. 1.

The first surface 6 of the release liner layer is suitably embossed as indicated by the protrusions 8 shown. As may be better understood by reference to FIG. 2, the embossed first surface 6 may be defined by a plurality of outwardly extending, spaced apart protrusions 8 that terminate in substantially a straight line. The protrusions of the present invention include such structures as posts and ridges, for example. The sides of the protrusions 9 and 10 are either parallel or can outwardly narrow. The sides 9 and 10 can outwardly narrow at varying degrees which affords a contact area at the protrusion termini 21. Generally, this contact area is planar but can be concave, convex or combinations thereof. Additionally, the sides 9 and 10 can outwardly narrow at varying degrees including up to the degree at which they substantially form a point.

The cross sectional shape of the protrusions 8 includes any shape that affords the desired release characteristics. Typically, the cross-sectional shape of the protrusions is determined by the manufacturing method employed to make them. Examples of useful cross-sectional shapes include circular, elliptical, polygonal and combinations thereof. Useful polygonal cross-sectional shapes include square, triangular, rectangular, and trapezoidal, for example. Protrusions with a circular cross-sectional shape are particularly useful.

Figure 3A:
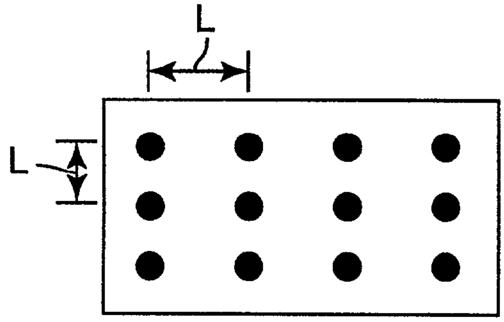
FIG. 3A is a plan view of a release liner layer of the present invention including protrusions with a circular cross-sectional shape that are arranged in a square array with of unit length L.
Figure 3B:
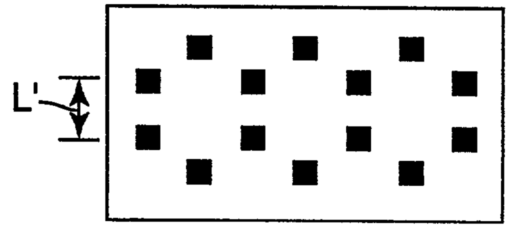
FIG. 3B is a plan view of a release liner layer of the present invention including protrusions with a square cross-sectional shape that are arranged in a hexagonal array with of unit length L'.
Figure 3C:
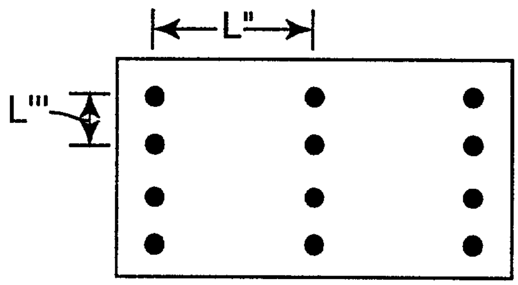
FIG. 3C is a plan view of a release liner layer of the present invention including protrusions with a circular cross-sectional shape arranged in a rectangular array having a major unit length L" and a minor unit length L'".
Figure 3D:
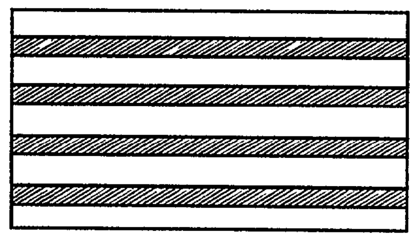
FIG. 3D is a plan view of a release liner layer of the present invention including protrusions that are arranged in a linear array.
Figure 3E:
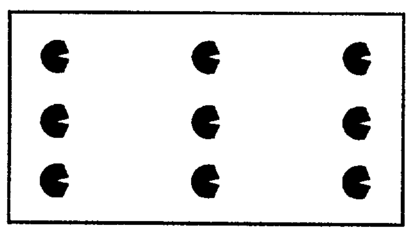
FIG. 3E is a plan view of a release liner layer of the present invention including protrusions arranged in a square array with a cross-sectional shape that is a combination of circular and polygonal.

The first surface of the release liner layer can be embossed with any array of protrusions that affords the desired release characteristics. Typically, the array of protrusions is determined by the manufacturing method employed to make them. Useful arrays include random, polygonal, circular, and elliptical, for example. Useful polygonal arrays include square, hexagonal, rectangular, and triangular, for example. Each array results in different packing and performance characteristics. For example, circular arrays will not close-pack while rectangular arrays can provide X-direction peel differing from Y-direction peel or intended misregistration against a similar pattern rotated 90° for example. Examples of useful arrays of protrusions embodied by the present invention may be better understood by reference to FIG. 3. FIG. 3A shows post-like protrusions with a circular cross-sectional shape that are arranged in a square array with of unit length L. FIG. 3B shows post-like protrusions with a square cross-sectional shape that are arranged in a polygonal array with of unit length L'. FIG. 3C shows post-like protrusions with a circular cross-sectional shape arranged in a rectangular array having a major unit length L" and a minor unit length L'". FIG. 3D shows ridge-like protrusions that are arranged in a linear array. FIG. 3E shows protrusions arranged in a rectangular array with a cross-sectional shape that is a combination of circular and polygonal.

The density of the protrusions 8 on the release liner layer includes any density that affords the desired release characteristics. Generally protrusion density is such that the adhesive layer 3 is not able to sag in between protrusions and touch the land 20 of the release material. The density of the protrusions 8 on the release liner layer may be 50 to 4000 protrusions per square inch (7.75 to 620 square centimeters). Useful protrusion densities include 500 to 1200 protrusions per square inch (77.5 to 186 per square cm) and 700 to 1000 protrusions per square inch (108.5 to 155 per square cm), for example. Additionally, protrusion densities of the present invention include 900 protrusions per square inch (139.5 per square cm).

The physical dimensions of the protrusions 8 include any that provide the desired release characteristics. Additionally, the physical dimensions of the protrusions are such that when compressive stress is applied, the protrusions do not bend or buckle and maintain their structural integrity so as to prevent the adhesive layer 3 from contacting the land 20.

The height of the protrusion above the land 20 is a variable that scales with adhesive thickness. The height of the protrusions 8 is that which is at least greater than the thickness of the associated adhesive layer so that under compressive load the protrusion termini 21 can penetrate the adhesive layer and contact the backing layer without the near adhesive surface contacting the land 20 of the release liner layer. For example, the height of protrusions 8 includes is that which is at least 4 mils (0.01016 cm) greater than the thickness of the associated adhesive layer. In one example, the height of protrusions 8 include those of 1 to 25 mils (0.00254 to 0.0635 cm). In another example, the height of protrusions 8 include those of 2 to 12 mils (0.00508 to 0.03048 cm). In a further example, the height of protrusions 8 include those of 3 to 8 mils (0.00762 to 0.02032 cm). In yet another example the height of protrusions 8 include those of 4 to 5 mils (0.01016 to 0.0127 cm).

Protrusions of the present invention include those with a width or diameter of 1 to 15 mils (0.00254 to 0.0381 cm), for example. In another example, the width or diameter of protrusions 8 include those of 2 to 10 mils (0.00508 to 0.0254 cm). In yet another example, the width or diameter of protrusions 8 include those of 3 to 5 mils (0.00762 to 0.0127 cm). Typically, the diameter or width of the protrusions varies with respect to the height of the protrusion.

The aspect ratio of protrusions of the present invention is that ratio between the height and width or diameter of protrusions 8. Generally, as protrusion height increases so will protrusion width or diameter so as to prevent bending or buckling of the protrusions and prevent the adhesive layer 3 from contacting the land 20. For example, protrusions of the present invention include those with an aspect ratio of 4:1 or less. In another example protrusions of the present invention include those with an aspect ratio of 2:1 or less.

The second surface 5 of the release layer 4 can remain unmodified or can also be embossed as described above for the first surface. The array embossed on the second surface can be the same as or different that that of the first surface. Additionally, the physical characteristics of the protrusions embossed on the second surface such as height, diameter, and cross-sectional shape, for example, can independently be the same or different from those on the first surface.

The thickness of the release liner layer land can be any thickness that imparts the desired processing characteristics, flexural stiffness, tear resistance and tensile strength. Examples of useful release liner layer land thicknesses include 1 to 10 mils (0.00254 to 0.0254 cm). Additional examples of useful release liner layer land thicknesses include 2 to 5 mils (0.00508 to 0.0127 cm).

The land 20 of the present invention may itself include a patterned texture or be essentially smooth. Such a patterned texture on the land 20 can include a series of protrusions, ridges, valley or a combination thereof providing that the patterned texture of the land does not interfere with the associated adhesive layer 3 and detrimentally affect the release characteristics of the release liner. Pattern textures such as protrusions or ridges, for example, that are present on the land 20 should be of such a dimension so as not to exceed the height of the protrusions 8 or contact the adhesive layer 3. For example, a patterned texture present on the land can consist of protrusions, whose shape is as described above with respect to protrusions 8, but are smaller in dimension than protrusions 8 which contact the adhesive layer 3.

The optional backing layer 2 can be any material known to those of skill in the art upon which an adhesive can be applied. Typically, the backing is selected from a group of materials including polymeric films of various stiffness such as, for example, polyolefins, polyesters, polycarbonates, polymethacrylates, plasticized PVC, papers, metal foils, foams, and woven or non-woven fabrics. Optionally, the backing could be a conventional release liner to provide a transfer tape, for example. Useful polyolefins include polyethylene and polypropylene, for example. If desired, the backing may be treated with mechanical or chemical priming.

The optional backing 2 can be an additional release layer 4 as described above. For example, a release layer 4 having a second surface 5 that is not embossed can act as a backing layer 2 when the second surface is associated with the adhesive layer 3. This is typical when composite structures 1 are in roll form.

Figure 4:
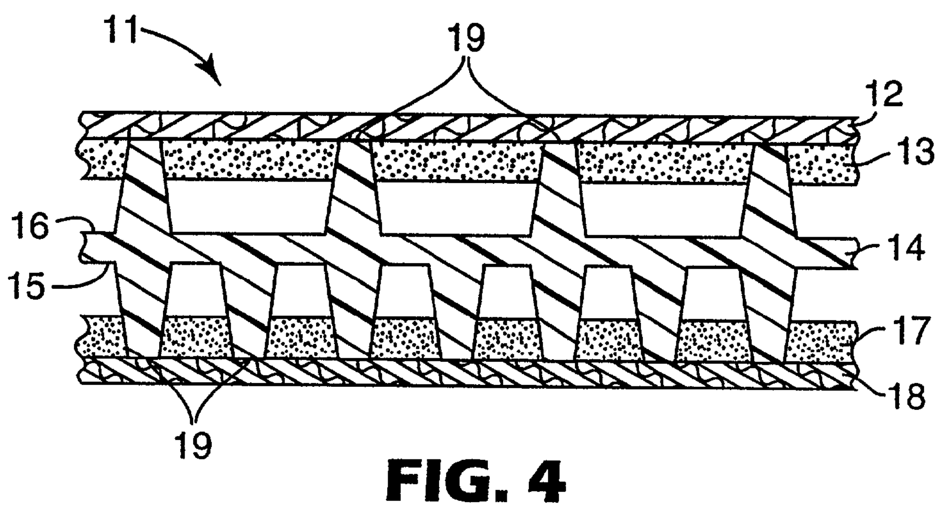
FIG. 4 is a cross sectional view of an article including an additional embodiment of the release liner layer of the present invention.

Referring to FIG. 4, the articles of the present invention also include composite structures indicated by general numerical designation 11 which include a first optional backing layer 12, a first layer of pressure sensitive adhesive 13, a layer of release liner layer 14, a second pressure sensitive adhesive layer 17 and a second optional backing layer 18. The layer of release liner layer includes a first surface 16 associated with the first pressure sensitive layer and a second surface 15 associated with the second pressure sensitive layer. The first and second sides are embossed with a plurality of outwardly extending, spaced apart protrusions 19.

The backing layers, first and second sides of the release layer, the pressure sensitive adhesive layer, and protrusions of an article of FIG. 4 are as described above.

The articles of the present invention may exist in a variety of physical forms. For example, the articles may be in sheet form or may be rolled, in either direction, to form a roll. In one example where the article of the present invention is rolled, the second side 5 of the release layer 4 contacts the adhesive layer 3 or optional backing layer 2. In an additional example where the article of the present invention is rolled, the optional backing layer 12 contacts the adhesive layer 17 or the optional backing layer 18, or the optional backing layer 18 contacts the adhesive layer 13 or the optional backing layer 12. In those instances when articles of the present invention exist in a roll or sheet form, the total article thickness of the backing(s), if any, plus the adhesive layer(s), plus the release liner layer(s) should be minimized while still maintaining release behavior under anticipated conditions of processing, storage and use. Minimization of total article thickness aids in space conservation and allows for increased amounts of material to be stored in these manners.

Release materials as described above provide improved release properties over those previously disclosed. The release materials of the present invention provide release from a broad variety of adhesive chemistries. Such materials provide release from 1.95 to 3.85 N/dm (from 50 to 100 grams of force per linear inch), for example. The release materials disclosed herein function at elevated temperatures and under compressive loads. Release materials disclosed herein also function without the need for additional release coatings. The absence of such release coatings is advantageous since this avoids the possibility of transfer of the coating to the adhesive or degradation of the coating at elevated temperatures or pressures. Additionally, the absence of such release coatings avoids the increased costs and manufacturing steps required to apply the coatings.

Release materials as described herein allow for improved outgassing of residual monomer in the release liner and/or the adhesive layer. The release materials as described herein also allow for improved removal of residual solvent. Removal of residual monomer or solvent is improved due to the presence of a gap between the release liner land and the adhesive layer. This gap is a result of the protrusions penetrating the adhesive layer and preventing it from making contact with the land. The presence of this gap affords the possibility of further improving outgassing or removal of residual solvent through the use of low pressure, elevated temperature, circulation of air, or a combinations thereof. For example, adhesive articles including a release material as described herein can be stored in roll form. These rolls of material can be stored in a low pressure environment at elevated temperatures so as to facilitate outgassing.

The release properties of the release materials disclosed herein are derived from a microstructured surface rather than from a release coating such as diorganopolysiloxanes and dimethylpolysiloxanes. The performance of these release materials is derived from penetration of the adhesive by the protrusions and the resulting reduction in contact area between the release liner layer and the adhesive.

Reduction in the amount of surface area in contact between two surfaces lowers the adhesion force between those two surfaces. In the present case, the protrusions embossed on the surface of the release liner layer are typically posts or ridges as described above and act to decrease the contact area between the release liner layer and the adhesive. However, the contact area of the release liner layer must be reduced while still providing enough flexural support to prevent the adhesive surface from contacting the land 20 of the release liner. Enough flexural support must exist to prevent the adhesive from sagging or flowing and making contact with the liner land. Thus, the release liner layer as disclosed herein includes certain arrays of protrusions of such a size and shape so as to balance the competing needs of contact area reduction, adequate flexural support of the adhesive layer to prevent its contact with the release liner layer land, and adequate flexural stiffness of the protrusions so as to avoid degradation of their structural integrity under compressive loads.

Simple reduction in contact area, however, will not alone result in the optimum release characteristics as disclosed herein. Reduction of the contact area to point or line contact at the surface of an adhesive layer alone does not afford a release liner layer with the release characteristics of the present invention. The microstructured release materials disclosed herein include arrays of protrusions that not only reduce the contact area between the release liner and the adhesive but also physically penetrate the adhesive layer. Penetration of the adhesive layer by the protrusions effectively allows the adhesive layer to be held away from the land of the release material. Thus, even though penetration of the adhesive layer by the protrusions effectively increases the contact area beyond that which it would have been if the protrusion were only to make point contact with the surface of the adhesive layer, the release materials of the present invention afford increased release properties. In examples where the height of the protrusion is greater than that of the adhesive layer the protrusion can penetrate the adhesive layer and make substantial contact with a backing layer. In this example the adhesive is held away from the land of the release liner layer even under compressive loads. Substantial contact between the backing layer and the protrusion allows the protrusion to bear the compressive load and not the adhesive layer. Compressive loads therefore, do not substantially increase the contact area between the release liner layer and the adhesive as the adhesive layer is forced toward the land of the release material. Thus, this release liner layer is suitable for uses involving any compressive force between the adhesive layer and the release liner layer such as storage of tapes in a roll form or the passing of a web through a nip created by two rollers. It is apparent that release materials as disclosed herein are useful for storage of tapes in roll form or processing of adhesives involving compressive forces.

Additionally, release materials disclosed herein, where the protrusions penetrate the adhesive layer, are useful at elevated temperatures, such as those up to at least 70° C., for example. Examples of release materials where the protrusions penetrate the adhesive layer and make substantial contact with a backing layer are particularly useful at elevated temperatures. At elevated temperatures adhesives can flow and migrate toward the release liner layer land. Protrusions that penetrate the adhesive layer and make substantial contact with a backing layer maintain a constant open distance between the adhesive layer and the release liner land. The presence of this open distance allows some flow or migration of the adhesive layer at elevated temperatures without compromising the release characteristics of the release liner layer as it inhibits contact between the adhesive layer and the release liner layer.

The release materials as described herein can be produced by stamping, pressing, injection molding or extrusion molding processes, for example. Generally, useful extrusion molding processes include those where a feed stream of thermoplastic resin is fed into an extruder from which a heated resin melt is fed through a die to a rotating cylindrical tool. Cavities in the cylindrical continuous surface of the tool can be optionally evacuated by an external vacuum system. The solidified resin is stripped from the tool by a stripper roll as a web that has an array of outwardly extending protrusions. A useful process, for example, employs a tool that can be cylindrical and has cavities recessed from a continuous surface that are the negatives of an array of protrusions. The process further involves the steps of moving the surface of the tool along a predetermined path, continuously injecting a molten, thermoplastic resin into the cavities in excess of the amount that would fill the cavities, which excess forms a layer of resin overlying the cavities and the surface around the cavities, continuously cooling the tool around the cavities to cause the molten resin to become molecularly oriented while it fills the cavities, allowing the injected resin to solidify, and continuously stripping from the tool the solidified resin layer as a backing and integral array of upstanding stems. An extrusion molding process used to produce a substantially continuous planar sheet of thermoplastic resin with an array of projections generally at right angles to one major surface of the sheet, such as that disclosed in U.S. Pat. No. 5,679,302 for example, is particularly suited for producing the release materials described herein.

The release materials as described herein can also be produced through profile extrusion or a pressing process. Useful profile extrusion processes include that disclosed in U.S. Pat. No. 4,894,060. Generally, useful pressing processes include those where a sheet of a heated resin melt, derived from a thermoplastic resin, is placed under a plate upon which pressure is applied. As pressure is applied, cavities or holes created in the surface of the plate fill with the heated resin melt to produce a series of outwardly extending protrusions with geometries and in an array corresponding to the cavities in the plate. Once cool, the solidified resin is stripped from the plate as a web that has an array of outwardly extending protrusions.

EXAMPLES

Table of Abbreviations

| | |
|---|---|
| Tape 1 | Super 33+ Electrical tape of 0.75 inch (1.9 centimeter) width commercially available from 3M Company, St. Paul, MN |
| Tape 2 | 850 Acrylic tape of 1.0 inch (2.54 centimeter) width commercially available from 3M Company, St. Paul, MN |
| Tape 3 | 8403 Green Silicone tape of 1.0 inch (2.54 centimeter) width commercially available from 3M Company, St. Paul, MN |
| Tape 4 | 9671 transfer tape of 1.0 inch (2.54 centimeter) width and adhesive thickness of about 57 micrometers commercially available from 3M Company, St. Paul, MN |
| Tape 5 | 9752 transfer tape of 1.0 inch (2.54 centimeter) width and adhesive thickness of about 53 micrometers commercially available from 3M Company, St. Paul, MN |
| ESCORENE 3445 | Polypropylene commercially available from Exxon Corporation, Houston, TX |
| PET | an aminated-polybutadiene primed polyester film of polyethylene terephthalate having a thickness of 38 micrometers |
| ESCORENE 1024 | Polypropylene commercially available from Exxon Corporation, Houston, TX |

Test Methods

T-Peel

T-peel (ASTM D1876-95) is used to determine the relative peel resistance between flexible adherends. The adhesive side of a test tape 2.54 cm wide by 10.16 cm long (1 inch wide by 4 inches long) was laminated to the release liner. The resulting specimen was tested after a specified dwell using an INSTRON materials tester (commercially available from Instron, Canton, Mass.) with the jaws moving at a crosshead speed of 30.5 cm/min (12 inches/min). The T-peel adhesion is reported in Newtons/decimeter (N/dm).

Liner Preparation Method for Liners A, B and C

The patterned liners were prepared in the following manner. Escorene 3445 was fed into a single screw extruder (supplied by Killion Extruders, Verona, N.J.) having a diameter of 3.175 cm (1.25 inches), a length/diameter (L/D) ratio of 24/1, and a temperature profile that steadily increased from approximately 160–232.2° C. (320–450° F.). The polymer was continuously discharged at speeds of 5–7 RPM and a pressure of at least 7.0307 kg per square cm (100 psi), through a necktube heated to 232.2° C. (450° F.) and into a 15.24 cm (6 inches) wide ULTRAFLEX L40 film die (supplied by Extrusion Dies, Inc.) maintained at a temperature of 232.2° C. (450° F.). The die gap was nominally set to 0.0254 cm (0.010 inches) and produced a molten sheet of polypropylene 15.24 cm (6 inches) wide. The molten sheet of polypropylene was delivered to the nip formed by the upper two rolls of a 3-roll stack comprising three 15.24 cm (6 inches) diameter, water-chilled, chrome-plated rolls maintained at 21.1° C. (70° F.). A silicone rubber tool 50.8 cm (20 inches) long, 25.4 cm (10 inches) wide, and 0.635 cm (0.25 inches) thick, having a multitude to high aspect ratio (ca. 7) cavities was affixed to the driven center roll with a high-temperature (i.e., rated to 204.4° C. (400° F.)), double-sided silicone adhesive tape (supplied by Specialty Tapes, Racine, Wis.), and seamed with Hi-Temp Red RTV silicone (supplied by ITW Fluid Products Group, St. Louis, Mo.). The tool contained 139.5 cavities (i.e., blind holes) per square centimeter (900 per square inch), each with a diameter of 0.03302 cm (0.013 inches) and a depth of 0.2286 cm (0.090 inches). A force of 875 N/dm (50 pounds per linear inch) was applied to the molten polymer in the nip to replicate the pattern on the tool. The replicated film exited the nip at 1.8288–3.048 meters per minute (6–10 feet per minute) but remained on the tool for a 180 degree wrap to facilitate cooling of the polymer melt. The microstructured film was then removed from the tool via lower chill roll and wound on a 7.62 cm (3 inch) diameter core with ca. 2.268 kg (5 pounds) of tension. These liners are all square arrays with 139.5 posts per square centimeter (900 posts per square inch) and an approximate diameter at the base of the posts of 254 micrometers and are characterized in Table A by the thickness of the "land" (the base layer of the liner) and the height of the posts.

Liner Preparation Method for Liner D

Escorene 1024 polypropylene was pumped through a 6.4 centimeter Davis Standard single screw extruder with a gradient temperature profile ending at 218° C. The screw was rotating at 14 revolutions per minute. The material was delivered to a 35.5 centimeter EBR die (commercially available from Cloeren Company, Orange, Tex.) heated to 204° C. The die gap was set to 0.05 centimeters and produced a molten sheet of polypropylene 25.4 centimeters wide. The molten sheet of polypropylene was delivered into a rotating nip comprised of a 46 centimeter diameter chrome plate roll and a rotating silicone tool. The 46 centimeter diameter roll was heated to a temperature of 38° C. and the rotating silicone tool was maintained at 38° C. The rotating silicone tool contained 139.5 holes per square centimeter (900 holes per square inch) and a diameter of 0.033 centimeters. The force applied to the molten polymer in the nip was 875 N/dm (50 pounds per linear inch). The film exited the nip at 6 meters per minute and was wound on a 7.6 centimeter diameter core with 4.5 kilograms of tension.

TABLE A

| Liner Designation | Approximate Land Thickness (micrometers) | Approximate Post Height (micrometers) |
|---|---|---|
| A | 100 | 110 |
| B | 130 | 175 |
| C | 130 | 300 |
| D | 130 | 130 |

Laminate Preparation Method

For each combination of adhesive tape and structured liner film, six samples were created. Three replicates were made with the adhesive stuck to the flat (non-patterned) side of the film, and three were prepared with the adhesive stuck to the patterned side of the films. This method provided a control of the peel force of the liner without the structure.

Samples of film were cut slightly wider than the test tapes and approximately 10 centimeters (4 inches) long. Tape samples were cut approximately 10 centimeters (4 inches) long, a paper slice was laminated to one end to form a tab, and then the tape and structured films were laminated together with a handheld 2 kg (4.5 pound) roller making two passes.

Examples 1–6

The liners A and B were laminated to test tapes 1–3 according to the above method. All samples were then placed into aluminum trays and placed into a convection oven held at 70° C. They were left in the oven for a week, taken to a controlled temperature and humidity room (23° C. and 50% RH), and allowed to equilibrate to temperature for about 1 hour. T-peel samples were run to the flat (non-patterned) side of the liner and to the patterned side according to the test method outlined above. These data are presented in Table 1. For Examples 1–4 samples that had been in a 70° C. oven for 1 week were placed in a 70° C. oven under a pressure of 9.52 kiloPascals for a week, taken to a controlled temperature and humidity room (23° C. and 50% RH), and allowed to equilibrate to temperature for about 1 hour. T-peel samples were run to the flat (non-patterned) side of the liner and to the patterned side according to the test method outlined above. These data are presented in Table 2.

TABLE 1

| Example | Liner | Test Tape | T-Peel on Flat Side after aging at 70° C. (N/dm) | T-Peel on Patterned Side after aging at 70° C. (N/dm) |
|---|---|---|---|---|
| 1 | A | 1 | 16.78 | 2.78 |
| 2 | B | 1 | 17.33 | 2.08 |
| 3 | A | 2 | 16.64 | 1.34 |
| 4 | B | 2 | 18.57 | 1.40 |

TABLE 1-continued

| Example | Liner | Test Tape | T-Peel on Flat Side after aging at 70° C. (N/dm) | T-Peel on Patterned Side after aging at 70° C. (N/dm) |
|---|---|---|---|---|
| 5 | A | 3 | 4.83 | 1.14 |
| 6 | B | 3 | 4.22 | 0.71 |

TABLE 2

| Example | Liner | Test Tape | T-Peel on Flat Side after aging at 70° C. and 9.52 kPa (N/dm) | T-Peel on Patterned Side after aging at 70° C. and 9.52 kPa (N/dm) |
|---|---|---|---|---|
| 1 | A | 1 | 10.39 | 1.89 |
| 2 | B | 1 | 12.70 | 2.36 |
| 3 | A | 2 | 16.85 | 1.97 |
| 4 | B | 2 | 19.57 | NT* |

*Not tested

Examples 7–11

Test tapes of varying thickness were prepared using Tape 4 (a transfer tape of thickness 57 microns) by laminating the transfer tape to a PET backing and then laminating additional layers of the transfer tape on top of this laminate. These tapes were laminated to liner C according to the above method. T-peel samples were run to the flat (non-patterned) side of the liner and to the patterned side according to the test method outlined above. These data are presented in Table 3.

TABLE 3

| Example | Layers of Tape 4 | Thickness (μm) | T-Peel on Flat Side (N/dm) | T-Peel on Patterned Side (N/dm) |
|---|---|---|---|---|
| 7 | 1 | 57 | 31.81 | 1.89 |
| 8 | 2 | 114 | 48.94 | 4.55 |
| 9 | 3 | 171 | 63.41 | 9.27 |
| 10 | 4 | 228 | 80.87 | 16.50 |
| 11 | 5 | 285 | 101.69 | 42.90 |

Examples 12–13 and Comparative Examples C1–C3

Test tapes of varying thickness were prepared using Tape 4 (a transfer tape of thickness 57 microns) by laminating the transfer tape to a PET backing and then laminating additional layers of the transfer tape on top of this laminate. These tapes were laminated to liner D according to the above method. T-peel samples were run to the flat (non-patterned) side of the liner and to the patterned side according to the test method outlined above. These data are presented in Table 4.

TABLE 4

| Example | Layers of Tape 4 | Thickness (μm) | T-Peel on Flat Side (N/dm) | T-Peel on Patterned Side (N/dm) |
|---|---|---|---|---|
| 12 | 1 | 57 | 46.69 | 2.34 |
| 13 | 2 | 114 | 60.77 | 11.60 |
| C1 | 3 | 171 | 76.46 | 61.60 |
| C2 | 4 | 228 | 100.12 | 92.19 |
| C3 | 5 | 285 | 96.82 | 104.16 |

Examples 14–15 and Comparative Examples C4–C6

Test tapes of varying thickness were prepared using Tape 5 (a transfer tape of thickness 53 microns) by laminating the transfer tape to a PET backing and then laminating additional layers of the transfer tape on top of this laminate. These tapes were laminated to liner D according to the above method. T-peel samples were run to the flat (non-patterned) side of the liner and to the patterned side according to the test method outlined above. These data are presented in Table 5.

TABLE 5

| Example | Layers of Tape 5 | Thickness ($\mu$m) | T-Peel on Flat Side (N/dm) | T-Peel on Patterned Side (N/dm) |
|---|---|---|---|---|
| 14 | 1 | 53 | 18.74 | 0.91 |
| 15 | 2 | 106 | 20.91 | 4.21 |
| C4 | 3 | 159 | 21.40 | 32.09 |
| C5 | 4 | 212 | 23.19 | 36.72 |
| C6 | 5 | 265 | 26.02 | 39.89 |

All patents referred to are hereby incorporated by reference. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An article comprising an adhesive layer, a backing layer in contact with said adhesive layer, and a release liner layer wherein said release liner layer comprises a first surface in contact with said adhesive layer and a second surface, wherein said first surface is embossed to provide a plurality of outwardly extending protrusions that penetrate said adhesive layer to make substantial contact with said backing layer, and wherein said adhesive layer does not contact the land of said release liner layer.

2. An article of claim 1, wherein said backing layer is a release liner layer of claim 1 wherein said second surface is in contact with said adhesive layer.

3. An article of claim 1, wherein said backing layer is a polymeric film, paper, metal foil, or fabric.

4. An article of claim 3, wherein said polymeric film is a polyolefin, polyester, polystyrene, plasticized polyvinyl chloride, polycarbonate or polymethacrylate film.

5. An article of claim 3, wherein said polymeric film is a polyethylene or polypropylene film.

6. An article of claim 1, wherein said second surface is embossed to provide a plurality of outwardly extending protrusions.

7. An article of claim 1, wherein said adhesive layer is a pressure sensitive adhesive.

8. An article of claim 7, wherein said pressure sensitive adhesive is selected from natural rubber, synthetic rubber, block copolymers, (meth)acrylates, silicones, and olefins.

9. An article of claim 1, wherein said release liner layer is a polymeric film.

10. An article of claim 9, wherein said polymeric film is a polyolefin, polyester, polycarbonate or polymethacrylate film.

11. An article of claim 9, wherein said polymeric film is a polyethylene or polypropylene film.

12. An article of claim 1, wherein said protrusions are posts with a cross-section shape selected from circular, elliptical, polygonal and combinations thereof.

13. An article of claim 12, wherein said protrusions have a cross-section shape that is selected from square, triangular, rectangular, trapezoidal, and combinations thereof.

14. An article of claim 12, wherein said posts have a circular cross section shape.

15. An article of claim 14, wherein said posts have a diameter of 1 to 13 mils.

16. An article of claim 14, wherein said posts have a diameter of 2 to 10 mils.

17. An article of claim 14, wherein said posts have a diameter of 3 to 5 mils.

18. An article of claim 1, wherein said protrusions are arrayed in a pattern selected from random, polygonal, circular, and elliptical.

19. An article of claim 1, wherein said protrusions are arrayed in a pattern selected from square, hexagonal, rectangular, and triangular.

20. An article of claim 1, wherein said protrusions are arrayed in a square pattern.

21. An article of claim 1, wherein the density of protrusions is 50 to 4000 per square inch.

22. An article of claim 1, wherein the density of protrusions is 500 to 1200 per square inch.

23. An article of claim 1, wherein the density of protrusions is 700 to 1000 per square inch.

24. An article of claim 1, wherein the density of protrusion is 900 per square inch.

25. An article of claim 1, wherein said protrusions have an aspect ratio of 4:1 or less.

26. An article of claim 1, wherein said protrusions have an aspect ratio of 2:1 or less.

27. An article of claim 1, wherein said protrusions have a height of 1 to 25 mils.

28. An article of claim 1, wherein said protrusions have a height of 2 to 12 mils.

29. An article of claim 1, wherein said protrusions have a height of 3 to 8 mils.

30. An article of claim 1, wherein said protrusions have a height of 4 to 5 mils.

31. An article of claim 1, wherein said protrusions have a height at least 4 mils greater than the thickness of the adhesive layer.

32. An article comprising: a first adhesive layer, a first backing layer in contact with said first adhesive layer, a release layer, and a second adhesive layer, and a second backing layer in contact with said second adhesive layer, wherein said release layer comprises a first surface in contact with said first adhesive layer and a second surface in contact with said second adhesive layer, wherein said first surface is embossed to provide a plurality of outwardly extending protrusions that penetrate said first adhesive layer to make substantial contact with said first hacking layer, wherein said second surface is embossed to provide a plurality of outwardly extending protrusions that penetrate said second adhesive layer to make substantial contact with said second backing layer, and wherein said first adhesive layer does not contact the land of said release layer.

33. An article of claim 32, wherein said protrusions on said first surface are present in a different array than those protrusions on said second surface.

34. An article of claim 32, wherein said protrusions on said first surface have different cross-section shape than those protrusions on said second surface.

35. A method for the release of an adhesive article from a substrate comprising the steps of:

i) applying the adhesive article to a substrate, and ii) removing the adhesive article from the substrate;

wherein the adhesive article comprises an adhesive layer and a backing layer in contact said adhesive layer, wherein said substrate comprises a first surface in contact with said adhesive and a second surface, wherein said first surface is embossed to provide a plurality of outwardly extending protrusions that penetrate said adhesive layer to make substantial contact with said backing layer, and wherein said adhesive layer does not contact the land of said substrate.

* * * * *

UNITED STATES PATENT AND TRADEMARK OFFICE

CERTIFICATE OF CORRECTION

PATENT NO. : 6,984,427 B2
APPLICATION NO. : 10/044367
DATED : January 10, 2006
INVENTOR(S) : Robert K. Galkiewicz It is certified that error appears in the above-identified patent and that said Letters Patent is hereby corrected as shown below:

Column 2,
Line 25, delete “modem” and insert in place thereof -- modern --.

Column 14,
Line 58, delete “hacking” and insert in place thereof -- backing --.

Signed and Sealed this

Fifteenth Day of April, 2008

JON W. DUDAS
*Director of the United States Patent and Trademark Office*